May 23, 1950  P. JESSEN  2,508,861
MACHINE FOR LOADING AND UNLOADING PACKAGES
Filed June 2, 1948  8 Sheets—Sheet 1
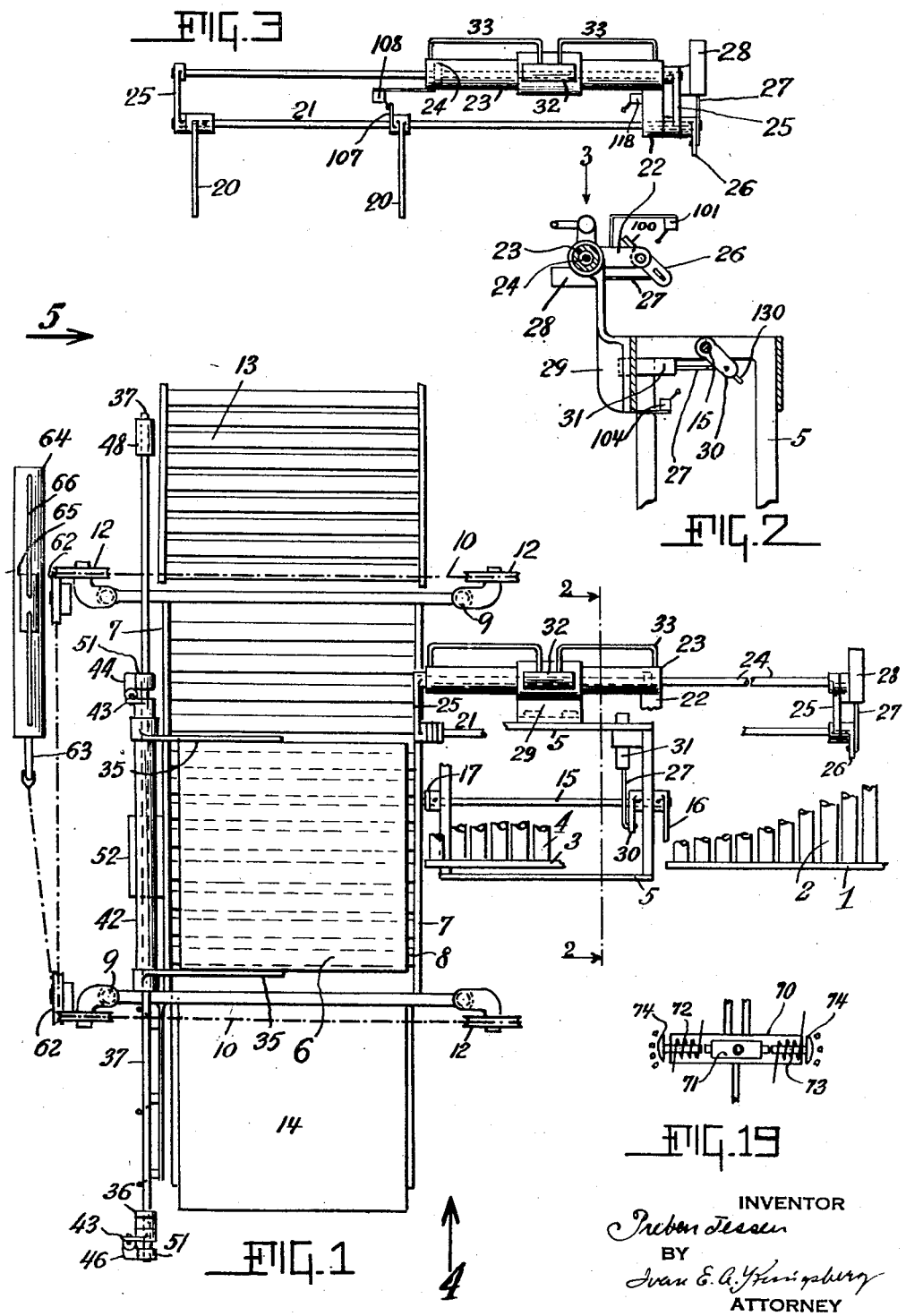
INVENTOR
Preben Jessen
BY
Ivan E. A. Konigsberg
ATTORNEY May 23, 1950 P. JESSEN 2,508,861
MACHINE FOR LOADING AND UNLOADING PACKAGES
Filed June 2, 1948 8 Sheets-Sheet 2
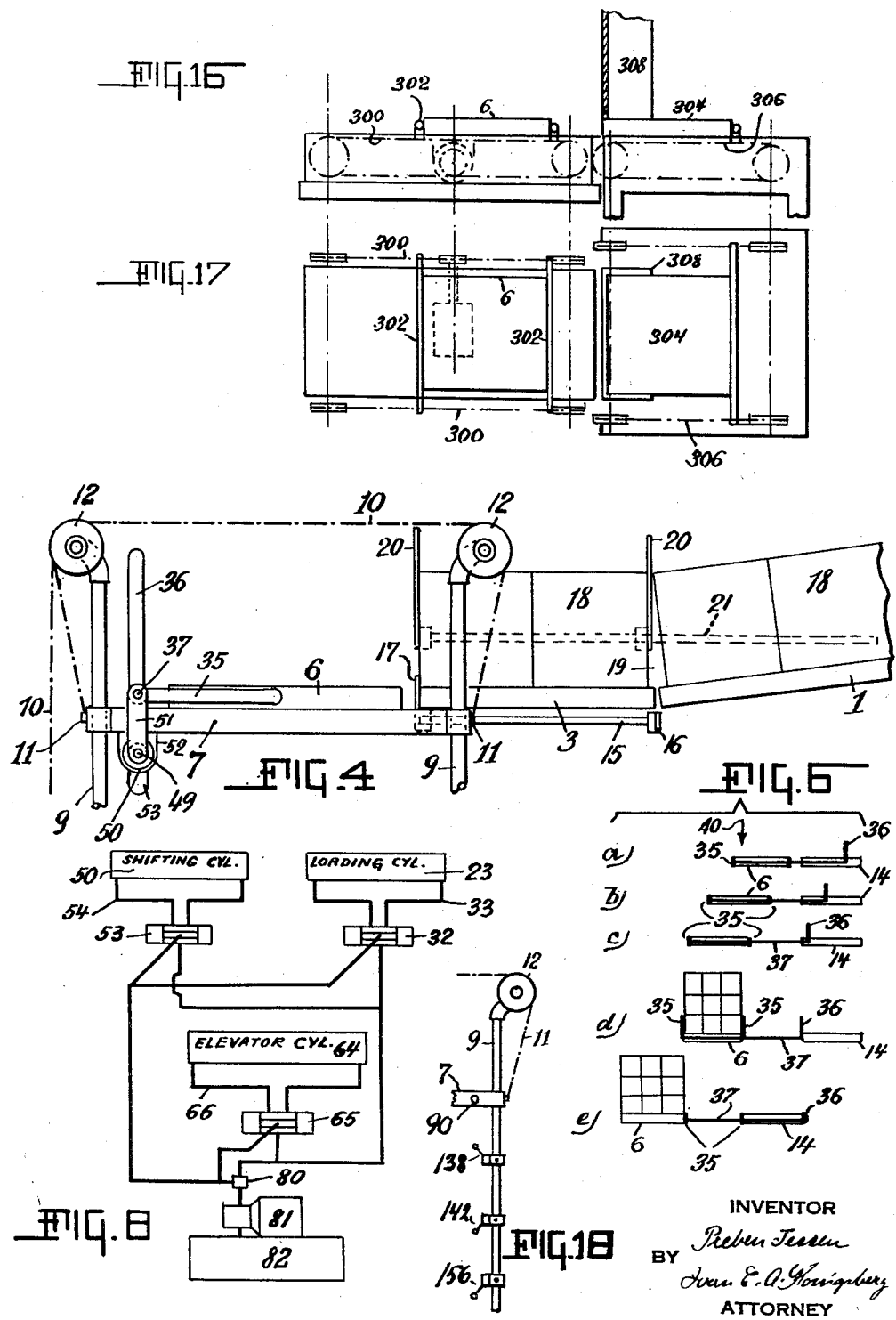
INVENTOR
Preben Jessen
BY
Ivan E. A. Konigsberg
ATTORNEY

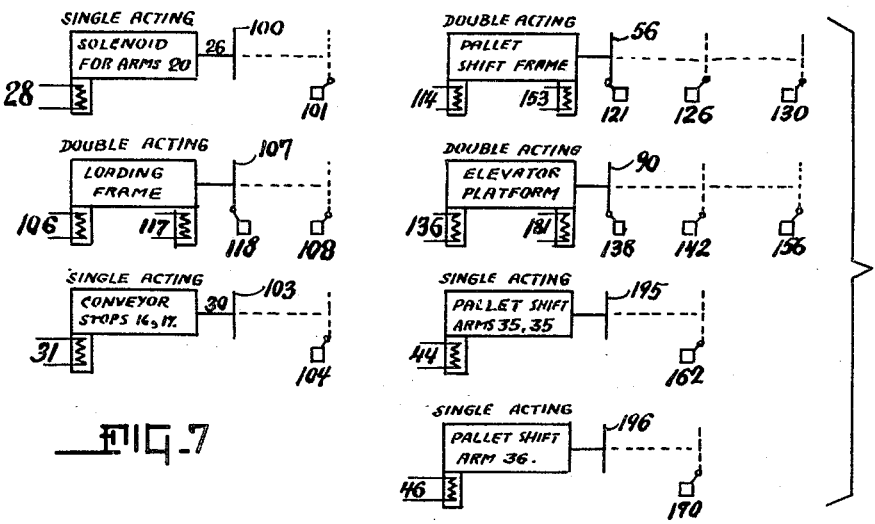
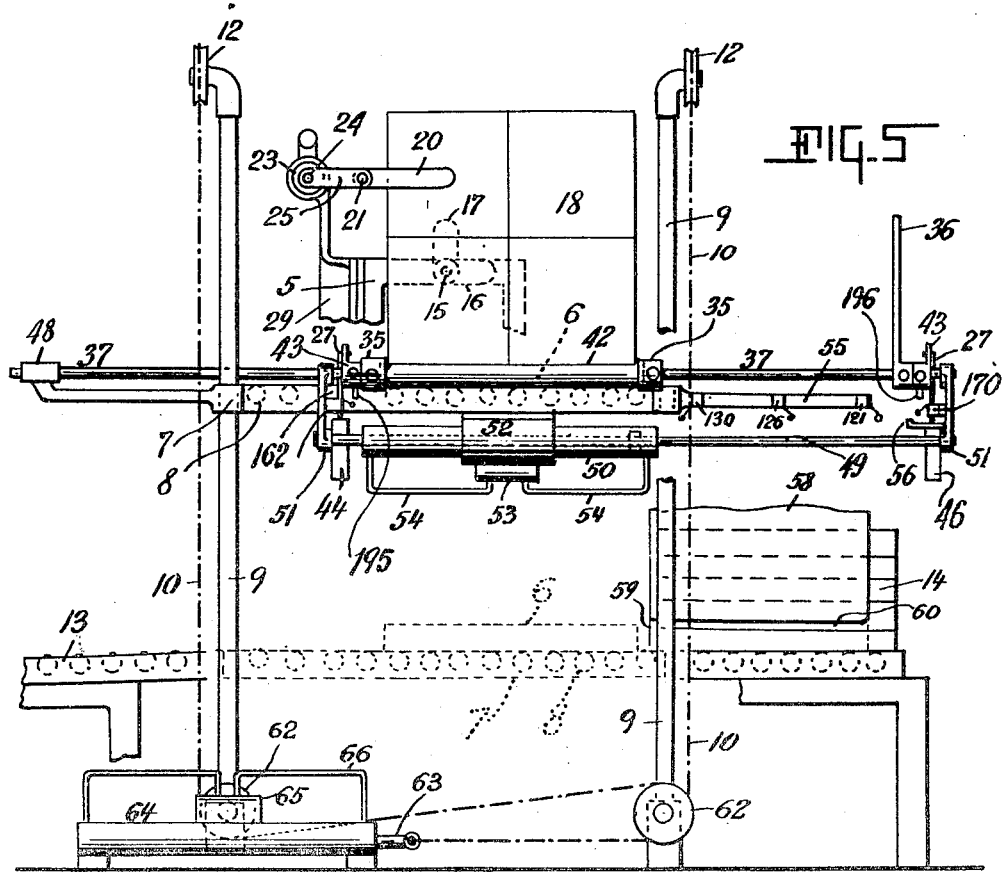

May 23, 1950          P. JESSEN          2,508,861
MACHINE FOR LOADING AND UNLOADING PACKAGES
Filed June 2, 1948          8 Sheets-Sheet 5

INVENTOR
Preben Jessen
BY
ATTORNEY

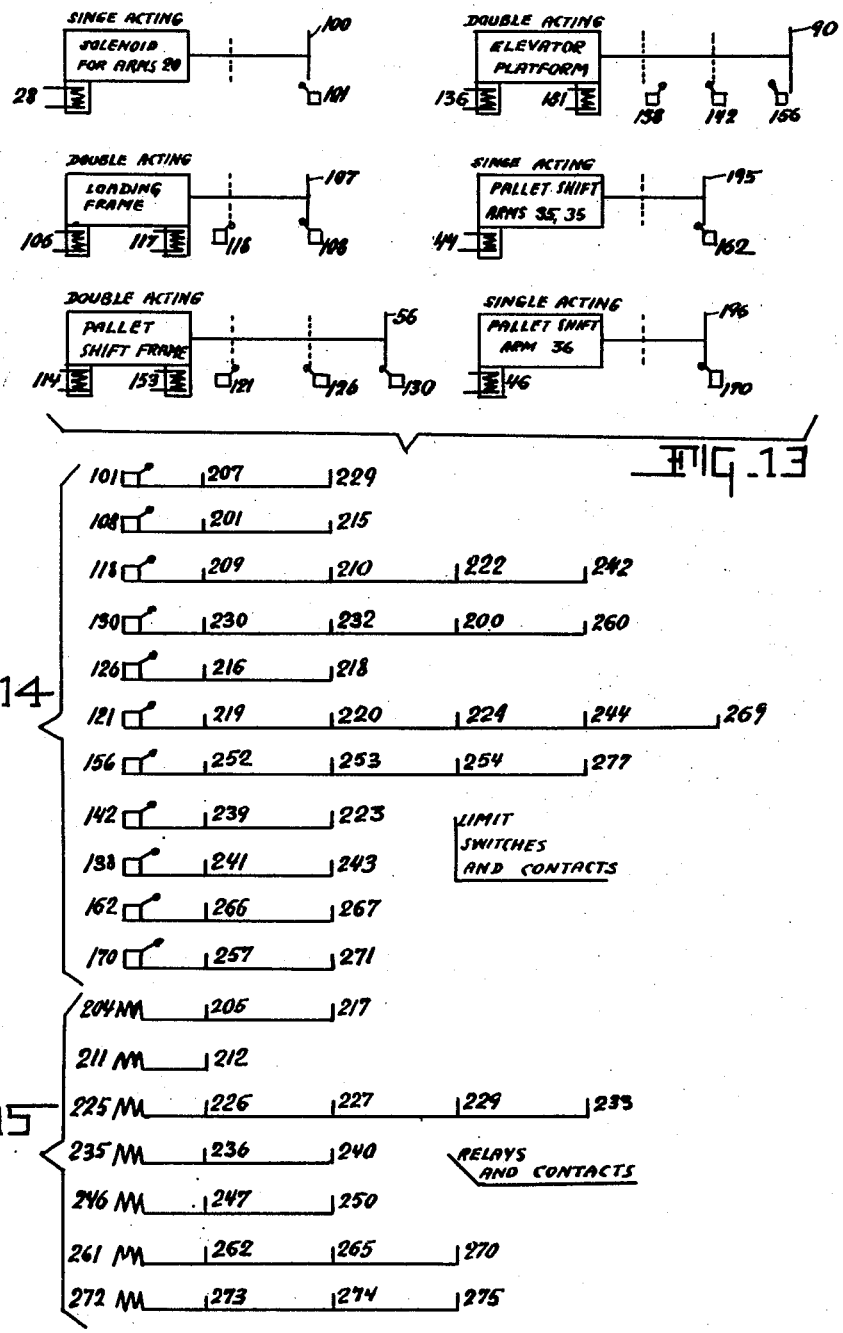

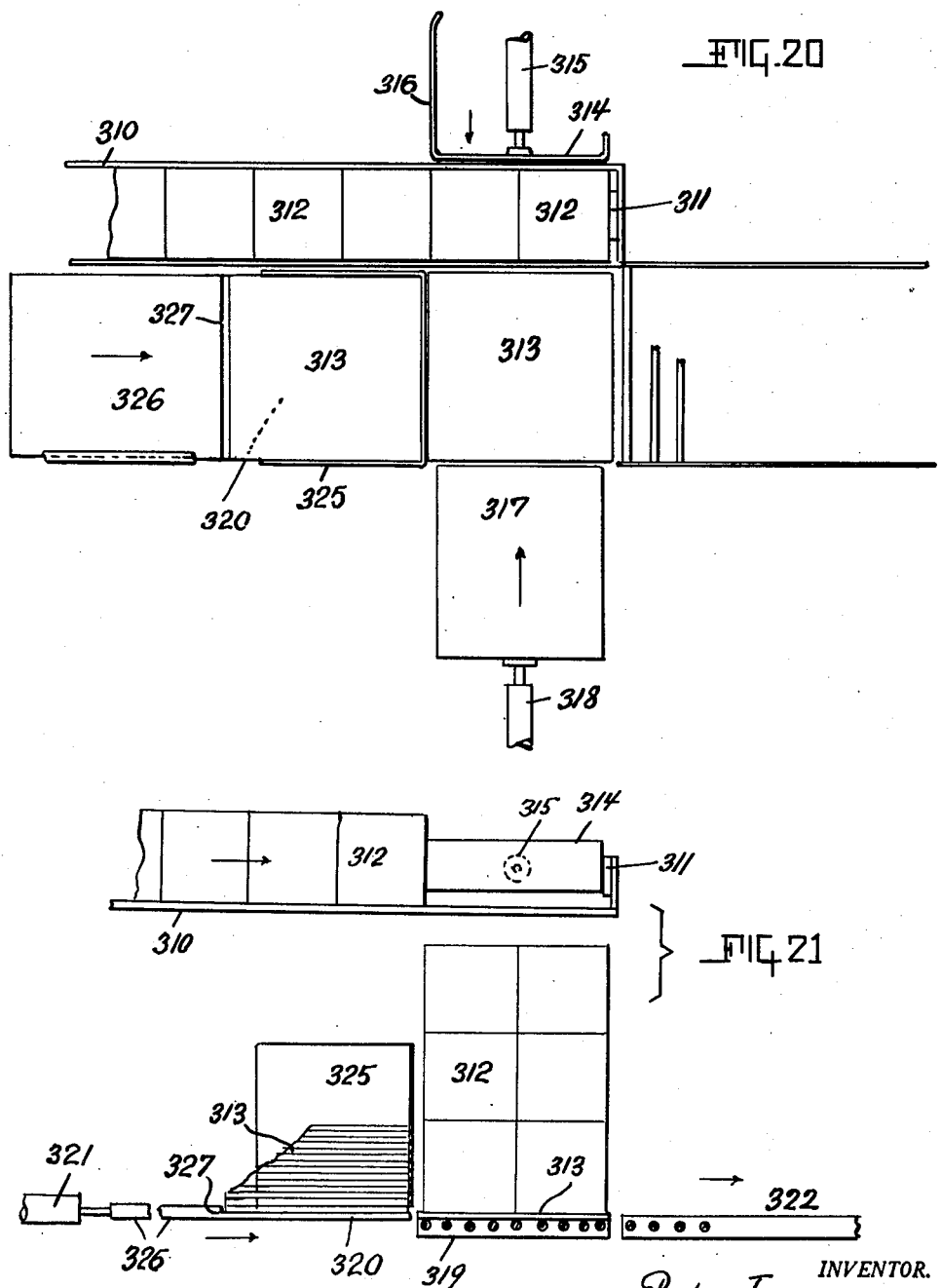

Patented May 23, 1950

2,508,861

UNITED STATES PATENT OFFICE 2,508,861

MACHINE FOR LOADING AND UNLOADING PACKAGES

Preben Jessen, Ridgefield Park, N. J.

Application June 2, 1948, Serial No. 30,578

9 Claims. (Cl. 214—6)

The object of this invention is to provide a completely automatic machine for loading boxed merchandise from a warehouse onto a pallet and discharging the loaded pallet so that it may be picked up by an industrial truck for delivery at some other place. The reverse operation may also be done by the machine. A loaded pallet may be taken into the machine and the load removed from the pallet for delivery into the warehouse. The connection between the warehouse and the machine is a conveyor which automatically feeds the boxes to the machine, as by gravity for example, and likewise automatically removes the boxes from the machine and delivers them into the warehouse.

The invention includes a number of submechanisms for carrying out the conception of a fully automatic machine for handling boxed merchandise from warehouse to industrial truck and vice versa. These submechanisms have the following functions. First, to separate a given number of boxes from the string of boxes delivered by the conveyor. This includes momentarily stopping the feed of boxes so that separation of a load unit can take place. Second, loading the separated load unit boxes onto the pallet which already is in receiving position in the machine. The loading operation includes shifting the pallet across the line of feed for each unit of boxes to be loaded so as to fill the pallet with a load consisting of tiers of boxes. Third, for each tier of boxes the pallet is lowered one step by an elevator which also is operated to raise an empty pallet to loading position or a fully loaded pallet (from the truck) to discharging position as the tiers of boxes are removed from the pallet. Finally, the shifting of the pallet across the line of feed includes removing (or taking in) a loaded pallet and taking in (or removing) an empty pallet.

An electric circuit is provided for complete automatic operation and the several movements are effected by means of solenoid valves, relays and limit switches of known construction for controlling hydraulic pressures in the operating cylinders.

The invention is embodied in a machine which has a main elevator structure for raising and lowering a platform upon which the pallet rests. At the top of the elevator a loading mechanism is provided for loading boxes onto the pallet. The platform also supports a pallet shifting mechanism so that the pallet may be shifted across the line of feed of boxes more than once for each tier of boxes and whereby the pallet may be lowered for each tier of boxes so as to build up the load.

Accordingly the invention is embodied in a load handling machine arranged and constructed as hereinafter described and as illustrated in the accompanying drawings in which Fig. 1 is a plan view of the machine showing an empty pallet at the top of the elevator ready to receive the first load unit. Parts are broken away and many details chiefly belonging to the electric circuit are omitted.

Fig. 2 is a sectional view on line 2—2 of Fig. 1 looking toward the warehouse conveyor.

Fig. 3 is a plan view looking in the direction of arrow 3 in Fig. 2 and shows the load moving mechanism in position above the pallet to deliver the first unit of boxes.

Fig. 4 is a transverse view of the machine looking in the direction of arrow 4 in Fig. 1 with details omitted and parts broken away.

Fig. 5 is a view looking in the direction of arrow 5 in Fig. 1 showing the pallet shifting mechanism and the elevator operation. In this view the elevator has been lowered two steps.

Fig. 6 is a diagram showing how the pallet is shifted while being loaded.

Fig. 7 is a diagram of the operating valve, solenoid and limit switches and illustrates the movements of the sub-mechanisms of the machine when boxes are loaded from conveyor to pallet.

Fig. 8 is a diagram of the power hook up to the operating cylinders.

Fig. 13 is a diagram of the operating valve, solenoid and limit switches as they are operated during the reverse operation: pallet to warehouse.

Figs. 14 and 15 are schedules similar to the schedules in Figs. 10 and 11 but refer to the reverse operation diagram in Fig. 12.

Figs. 16 and 17 illustrate a modification.

Fig. 18 is a detail view showing the location of the elevator limit switches.

Fig. 19 is a diagram of a solenoid operated valve.

Figs. 20 and 21 illustrate another modification.

Figure 9:
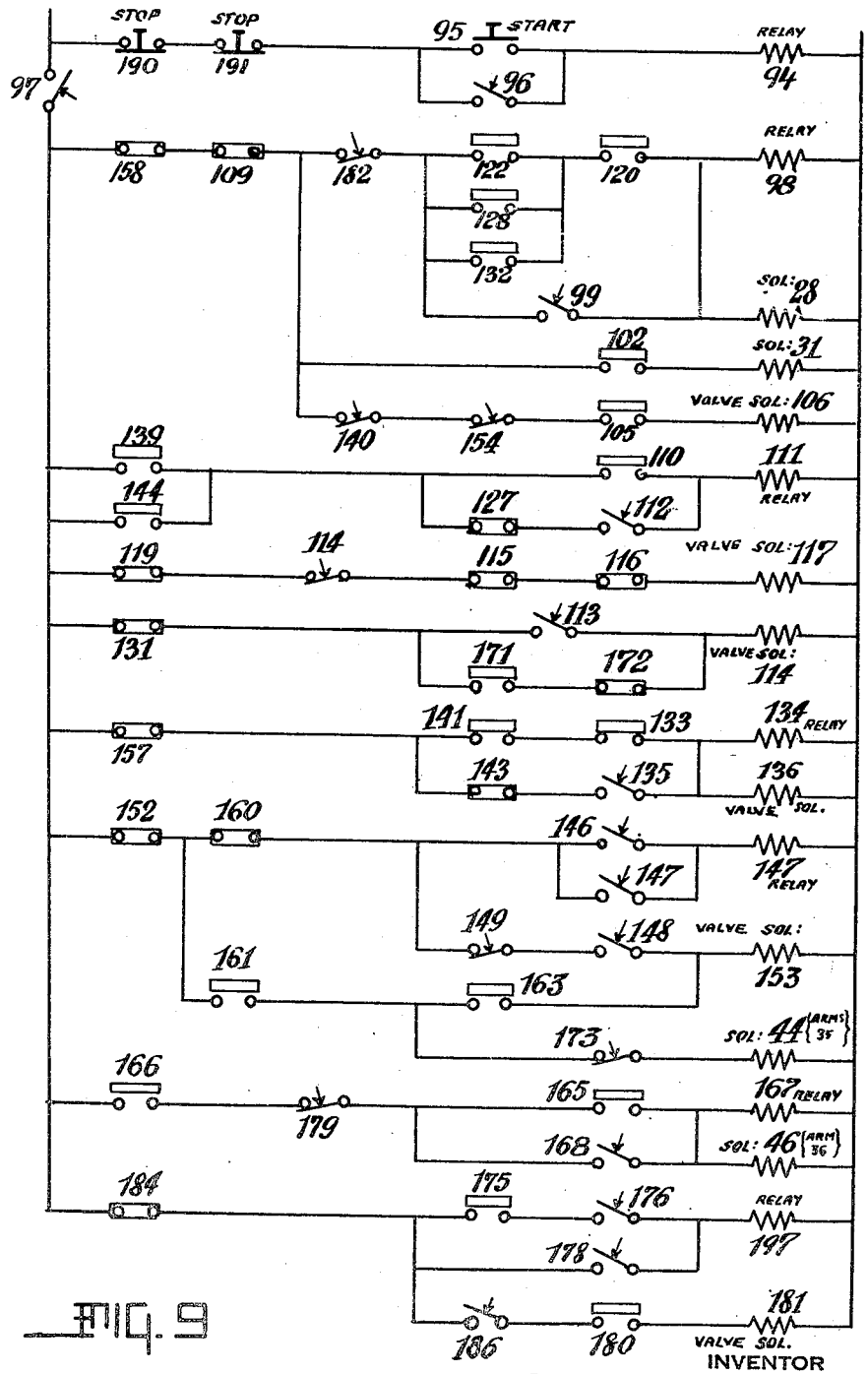
Fig. 9 is a wiring diagram of the valve solenoid and auxiliary relays and their functional contacts and connections to effectuate the automatic operation of loading a pallet and discharging it from the machine.

In disclosing the invention the mechanical mechanisms and their functions and operations will be explained first. Thereafter the hydraulic and wiring diagrams will be referred to.

Referring to Figs. 1–5, the boxes from the warehouse are fed to the machine on an inclined conveyor 1 which may be a smooth slideway or provided with rollers 2 as shown. The installation may be such that the boxes 18 are fed by the conveyor by gravity, or the conveyor may be power operated (not illustrated). In front of the inclined conveyor there is placed an intermediary platform 3 comprising a framework with rollers 4. The platform 3 rests upon a framework 5 and its function is to support the number of boxes which form a unit to be loaded upon the pallet apart from the boxes coming in on the first conveyor 1.

From the platform 3 the boxes are moved onto an empty pallet 6 which is already in load receiving position on top of the elevator. As best seen in Fig. 4 the empty pallet rests upon an elevator platform 7 provided with rollers 8 to slidably support the pallet, Figs. 1 and 5. The elevator platform is slidably supported on upright posts 9, 9 on which the platform is raised and lowered by means of cables 10 which are attached to the platform at points 11, 11, Fig. 4, and pass upward over pulleys 12, 12 and then down to an operating elevator cylinder. As the boxes are placed upon the pallet 6 they form tiers or layers and for each such tier the platform is lowered one step until the pallet is fully loaded. When the loaded platform 6 has reached its bottom position, shown dotted in Fig. 5, it is pushed out of the machine onto an inclined delivery conveyor 13, from which the loaded pallet is removed by an industrial truck (not shown). Thereafter an empty pallet from a stack of empty pallets 14 is moved onto the elevator platform 7, the elevator is raised to the top and the new empty pallet is then loaded.

The foregoing is a brief description of the movements of the boxes onto the pallet, through the machine and out. This passage of the boxes through the machine is accomplished by the following sub-mechanisms.

First, the flow of boxes down the warehouse conveyor 1 is stopped while the loading takes place and the boxes to be loaded are separated so as to be handled as a load unit. Underneath the intermediary platform 3 there is supported a rockshaft 15 which carries two stops in the form of short arms 16 and 17 affixed to the shaft at right angles to each other. In order to distinguish these stops, the stop 16 will be called the first stop and 17 the second stop in their order of position in the line of feeding of the boxes to the machine. The normal position of these stops is as shown in Fig. 4. The line of boxes 18 coming down the conveyor 1 is stopped by the second stop 17, which is in upright position, while the first stop 16 is down. Inasmuch as the intermediary platform 3 is horizontal there will be a natural separation at the bottom between the boxes on the platform and the line of boxes on the conveyor whereby a space 19 is automatically provided.

While the boxes are on platform 3 they are gripped by a loading mechanism for removal onto the pallet 6. The loading mechanism comprises two arms 20, 20 affixed to a rockshaft 21 and spaced apart a distance equal to the number of boxes which are to form a load unit. As the boxes pass from conveyor 1 to platform 3 the load arms are in upright position, but when the selected number of boxes have come to rest against the second stop 17, the load arms 20 are lowered to grip the load unit at both ends.

This lowering—and later raising—of the loading arms 20 is accomplished by the following means. As seen in Figs. 1, 2 and 3, the rockshaft is rotatably and slidably supported in a fixed support 22 secured to an operating loading cylinder 23 which in turn is supported on the frame 5 by a bracket 29. The cylinder has a piston rod 24 and the ends of the latter and of the rockshaft 21 are joined by yokes 25. Hence, as the piston is operated by the cylinder, the rockshaft 21 is likewise moved from the load unit gripping position in Fig. 1 to the loading position in Fig. 3 where the arms 20 are raised and the boxes placed upon the pallet.

The rotatory movements of the rockshaft 21 are caused by the following means. Upon the rockshaft is secured an arm 26 which has a pin and slot connection with a rod 27 which is slidably operated by a solenoid 28. The solenoid is single acting and as it is energized and deenergized the rod 27 slides back and forth and in turn causes the arm 26 to assume two positions ninety degrees apart, that is, the rockshaft 21 is rotated through a ninety degree angle so that the arms 20 are lowered as in Fig. 5 to grip the boxes and raised as in Fig. 4 before gripping the boxes and also to release the boxes. The parts are so timed that right after the boxes have been stopped by stop 17, the arms 20 are lowered to grip the load. Then the arms with the load are moved in over the pallet. The arms are raised to release the pallet and thereafter the arms are returned into their out position as in Fig. 4.

The loading and return movement of arms 20 is caused by the load cylinder 23 to actuate its piston 24 as will be explained later. The stops 16 and 17 are operated by means similar to those described for raising and lowering the arms 20. As seen in Figs. 1 and 2 the rockshaft 15 which carries the stops 16 and 17 is supported in the support 5. At one end the shaft carries an arm 30 which is operated by a single acting solenoid 31 and rod 27 the same as shown in Figs. 2 and 3 for the rockshaft 21. As the solenoid 31 is energized and deenergized the arm 30, the rockshaft 15 and the stops 16 and 17 are moved through an angle of ninety degrees. The parts are so timed that when the boxes coming from the conveyor 1 reach the stop 17 the solenoid is actuated to rock the shaft 15 whereby to lower stop 17 and raise stop 16. The latter therefore stops the feed of the boxes on conveyor 1. At the same time the solenoid 28 is actuated so that the loading arms 20 are lowered to grip the first two boxes or load unit. Then pressure in the cylinder 23 is caused to operate the piston 24 whereby to move the load unit onto the pallet. Immediately thereafter the solenoid 28 is again actuated to raise the loading arms 20 and the pressure is reversed in cylinder 23 so that the arms 20 return to grip the next load unit. As soon as the first load unit has left the platform 3, solenoid 31 is actuated and the rockshaft 15 is rotated so that the stop 16 is lowered to release the incoming boxes and stop 17 is raised to stop them on the platform 3. The cylinder 23 is controlled by a valve 32 connected to the cylinder by pipes 33. The elements shown in Fig. 3 will hereinafter be called the loading frame.

The entire machine is built to handle boxes of merchandise of a given size for quantity loading and unloading. In the drawings the embodiment of the invention is shown as being a machine in which the boxes are one-quarter the size of the pallet, by way of example. Therefore, when the first load unit of two boxes deep is put on the pallet, it occupies just one-half of the pallet. The latter must therefore be shifted across the line of feed so that the next load unit of two boxes may be placed alongside the first two boxes, the first for boxes forming the first tier on the pallet.

The pallet shifting operations will be understood from the diagram in Fig. 6 in which it is assumed that three tiers of boxes of three units in each tier constitute a full pallet load. In Fig. 6 the pallet to be loaded is marked 6, as above, and the empty pallet is marked 14, as above. The pallet is shifted across the line of feed by three shifter arms, namely two arms 35, 35 which are operated together as one element and a third arm 36. These arms are carried by a slidably operated rockshaft 37. Arrow 40 indicates the line of feeding boxes to the pallet.

Reading diagram, Fig. 6, from top to bottom, position a shows the pallet 6 in loading position at top of the elevator. Here the pallet receives the first unit. Next the pallet is shifted to position b where the next unit is placed along the first unit. Next the pallet is shifted to position c where the third unit is put on the pallet and thus the first tier is formed.

Thereafter the pallet is lowered one step and shifted back to a position a and then to positions b and c to receive the second tier of boxes. These operations are repeated again so that in position d the pallet has a full load. In position d the arms 35 will be raised to release the load, arm 36 having been raised right along so as to by-pass the empty pallets.

Next the shaft 37 is shifted to the right in position d and all the arms lowered whereby the empty pallet is seized (not shown). Then the shaft 37 is shifted to the left to position e whereby to place the empty pallet 14 in the line of feed 40 and the loaded pallet 6 is pushed out of the machine to be removed.

Thereafter the pallet 14 is raised to the top. The arm 36 is raised and the parts are back in position a ready for the next load. In order, therefore, to load a pallet it must be shifted across the line of feed to receive successive units in any one tier of units. During this operation the arms 35, 35 are necessarily lowered to grip the pallet. The operations in Fig. 6 also require raising and lowering of the arms 35, 35 and 36 at different times for the purposes shown in the diagram. The elements which operate and actuate the pallet shifting mechanism will now be described.

The pallet shifter arms 35, 35 and 36 are shown in Fig. 5 in the positions they occupy when the pallet 6 is gripped by the arms 35 and a load of two tiers of boxes 18 has been placed on the pallet. The latter has therefore been lowered one step to receive the second tier. The arm 36 is raised so as to bypass the stack of empty pallets 14 which may be as high as conveniently desired.

The arms 35 are secured to a sleeve 42 rotatably carried by the rockshaft 37. On the sleeve is affixed an arm 43 which is actuated by a solenoid 44 and rod 27 similar to that described for rotating rockshafts 15 and 21. The energizing and deenergizing of solenoid 44 therefore causes raising and lowering of the arms 35. The arm 36 is likewise raised and lowered by means of a solenoid 46, rod 27 and arm 43 already described. The rockshaft 37 is slidably supported in a bearing 48 and is connected to the piston rod 49 of a shift cylinder 50 by yokes 51, 51. The bearing 48 is carried on the elevator platform 7 and the cylinder is likewise supported on this platform by a support 52. The support carries a solenoid valve 53 connected to the cylinder by pipes 54. Thus it will be clear that by actuating the piston rod 49 the shifter arms are shifted across the line of feed, and by actuating the solenoids 44 and 46, the shifter arms may be raised and lowered at the proper times to accomplish the schedule of operations diagrammed in Fig. 6.

The elements for shifting the pallet on the elevator platform 7 will hereafter be called the pallet shifting frame. The movements to shift the pallet are controlled by three limit switches 121, 126 and 130 which are mounted on an arm 55 on the elevator platform and spaced to accord with the movements required to shift the pallet. The three limit switches are sequentially tripped by a pin 56 mounted on the adjacent yoke 51. When the arms 35 are operated by the solenoid 44, a pin 195 on the arm 43 trips a limit switch 162 mounted on the adjacent yoke 51 (left hand side of Fig. 5). When the arm 36 is operated by the solenoid 46, a pin 196 on the other arm 43 trips a limit switch 170 mounted on the other yoke 51 (right hand side of Fig. 5). The operations of the solenoid rods 27, arms 43, tripping pins 196 and 170 are similar to those described for solenoids 28 and 31 in Fig. 2 and are therefore not especially illustrated.

The empty pallets 14 are suitably stacked in a bin 58 which is open at the bottom at 57 and 60 to permit entry of the shifter arms for removing the lowermost empty pallet and move it onto the elevator platform 7.

The elevator cables 10 pass downward from the pulleys 12 to pulleys 62 and are then connected to the piston rod 63 of the elevator cylinder 64 which is controlled by a solenoid valve 65 through pipes 66. The vertical movements of the elevator are controlled by limit switches 138, 142 and 156 which may be mounted on one of the posts 9 as seen in Fig. 18. These switches are actuated or tripped by a pin 90 on the elevator platform. There will be as many elevator limit switches as there are tiers of boxes to be loaded on the pallet and they are accordingly adjustably secured to the post by movable collars as shown. It is understood of course that wherever limit switches are placed, they are adjustable to suit the operations required. Also, that wiring is flexible where necessary and hydraulic pressure supply pipes are also flexible where they partake of bodily movements of a valve. These details being within the skill of trained electricians and machinists are not illustrated.

The machine so far described includes a loading cylinder 23, a shifting cylinder 50 and an elevator cylinder 64. Also three double acting solenoid operated cylinder valves 32, 53, 64, and four single acting solenoids 28, 31, 44, 46 for actuating the several arms and stops. The solenoid actuated valve shown diagrammatically in Fig. 19 is a well known type. It includes a valve housing 70 with four ports and port opening and closing means 71 operated by solenoids 72, 73 contained in the valve housing. The solenoids carry contact numbers 74 for opening and closing contacts in an electric circuit. Fig. 19 is shown to facilitate the reading of the wiring diagrams and the reference numbers in Fig. 19 are not repeated in describing the diagrams.

The diagram in Fig. 8 shows the cylinders and valves connected via a pilot valve 80 to a compressor 81 and oil tank 82. The diagram is a conventional representation of the power supply and hook up to the valves and cylinders. It needs no special description. The four valve port connections referred to in Fig. 19 appear clearly in Fig. 8.

Automatic operation: Coming now to a description of the automatic operation of the machine reference is had to the functional wiring diagram in Fig. 9, the diagram in Fig. 7 and the schedules in Figs. 10 and 16. The elements in the diagrams are the valve solenoid and contacts operated thereby, also auxiliary relays and their contacts. The diagrams also include contacts closed and opened by operation of the limit switches which are tripped by an element on some moving part of the machine as described above.

Figure 10:
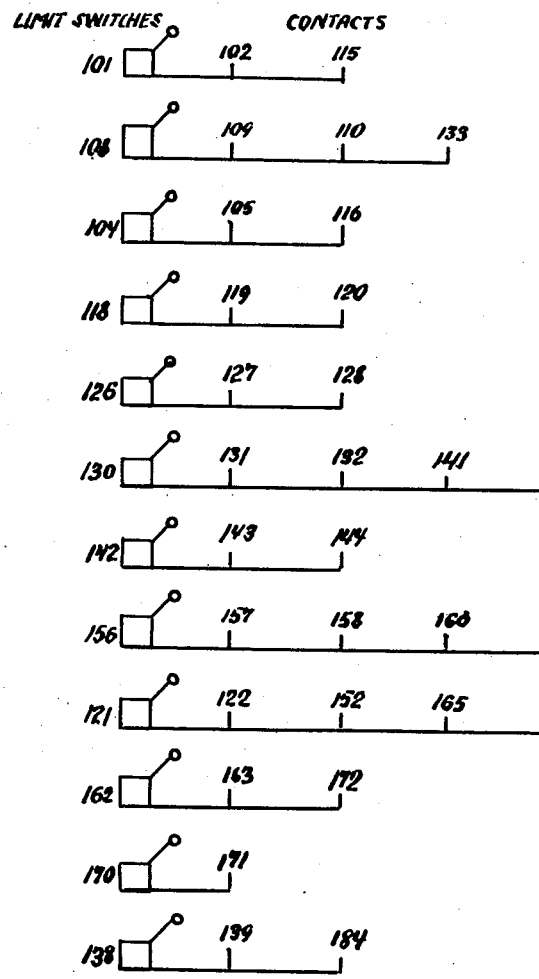
Fig. 10 is a schedule of the limit switches and their contacts described in the wiring diagram Fig. 9.
Figure 11:
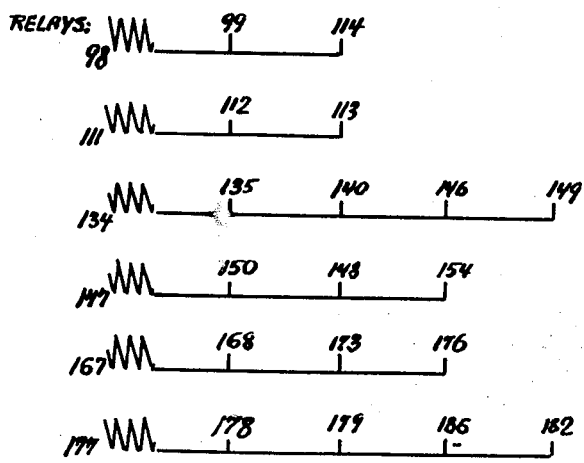
Fig. 11 is a schedule of the auxiliary relays and their contacts shown in the diagram Fig. 9.

The solenoids in the cylinder valves are operated to open and close the valve ports and also to make or open contacts or switches in the electric circuit in a manner known to the electric art. Limit switches are shown diagrammatically. It is understood that such switches or relays may have a number of contacts so that when a switch or relay is tripped by a moving element, connections corresponding to the operations of the circuit are made or broken. All coils and contacts are shown in the wiring diagrams in relative poistions whereby to simplify reading across the diagram. The several operations are listed under separate heads. The arrow heads on the switch contacts indicate the opening and closing of the contact when the corresponding relay or solenoid coil is energized or de-energized, or when the switch contact is closed or opened when a limit switch is actuated or tripped. All the contacts are shown in Fig. 9.

*Operation A.*—The normal starting will be with an empty pallet in position at the top of the elevator ready to receive the first load unit. The loading arms 20, will be in their out position alongside the intermediary platform 3. The first stop 16 will be down, the second stop 17 will be up, all as shown in Fig. 4. The pallet shifter arms 35, 35, 36 will be in the loading position (a) in Fig. 6. Operation is started by closing the starter switch 95, Fig. 9 whereby to energize an under-voltage relay 94 having a contact 96 to seal it in and another contact 97 to energize the electric circuit. The auxiliary relay 98 will be energized immediately. The relay contact 99 will close and the solenoid 28 (Fig. 7) will be energized to lower the arms 20. A pin 100 on arm 26 on the rockshaft 21 will then trip a limit switch 101 to close its one contact 102 and thereby energize solenoid 31 to operate rockshaft 15, to raise stop 16 and lower stop 17.

*Operation B.*—A pin 103 on arm 30 on rockshaft 15 will then trip a limit switch 104 to close its contact 105 and energize the one solenoid 106 (Fig. 7) in valve 32 so that pressure is admitted to load cylinder 23 to move the loading frame in over the pallet and place the first load unit on the pallet. At the end of this loading movement a pin 107 on the loading frame will trip a limit switch 108 to open its one contact 109 to de-energize valve solenoid 106 to stop the loading movement.

*Operation C.*—At the same time a second contact 110 in limit switch 108 will close and energize a relay 111 which operates two contacts. The first contact 112 will close to seal in, the second contact 113 will close to energize valve solenoid coil 114 in valve 52 so that pressure is admitted to the pallet shifting cylinder 50 to operate to shift the pallet.

*Operation D.*—The opening of the contact 109 (operation B) also de-energizes relay 98 thereby releasing solenoid 28, thus causing the loading arms 20 to be raised and release the load unit, and also releases solenoid 31 thereby raising lowering stop 16 and raising stop 17 so that the next load unit can pass on to the platform 3.

*Operation E.*—Upon the release of solenoid 28 a second contact 115 in limit switch 101 will close and a second contact 116 in limit switch 104 will also close. Since contact 113 has reclosed after the de-energization of relay 98 (operation D), the other solenoid 117 in valve 32 will operate to reverse the pressure in cylinder 23 and the loading arms 20, now raised, will return to their out position above platform 3. At the end of this return movement pin 107 will trip limit switch 118 to open a contact 119 and the return movement will stop.

*Operation F.*—At this time the contact 120 on limit switch 118 will reclose to allow for the next loading movement. However, the pin 56 on pallet shifter frame has tripped limit switch 121 to open its contact 122 to prevent loading while the pallet is being shifted.

*Operation G.*—The shifter frame will move one space when the pin 56 will trip limit switch 126 to open its one contact 127 thus de-energizing relay 111 and the solenoid 114 in valve 52 to stop the shifter frame. At the same time the second contact 128 in switch 126 will close to again energize relay 98. Another load unit will now be loaded upon the pallet and the shifter frame will travel another space as a result of a repetition of the foregoing described operations A to G, and the pallet will gradually be loaded with boxes.

*Operation H.*—When the pallet shifter frame has completed its last transverse travel the pin 56 thereon will trip another limit switch 130 and a contact 131 therein will open to de-energize solenoid 114 in valve 52 and the shifter frame will stop. A second contact in switch 130, namely contact 132 will close to again energize relay 98 and operations A to F will be repeated.

*Operation I.*—During operation H, when limit switch 130 is tripped, its third contact 133 will close to complete a circuit through contact 141 to energize relay 134 which operates four contacts. Contact 135 will seal the relay in and at the same time will energize solenoid 136 in elevator valve 65 to start lowering the elevator. The pin 90 (Fig. 14) will trip a limit switch 138 and a contact 139 therein will open to de-energize the relay 111. Then contact 140 on the relay will open to prevent loading while elevator is moving. The elevator will move down one step when pin 90 will trip limit switch 142 to open its contact 143 to de-energize relay 134 and valve solenoid 136 thereby stopping the elevator at that point. Contact 144 will close for the next operation of relay 111.

*Operation K.*—Simultaneous with operation I contact 146 will close to energize relay 147. Its contact 150 will close to seal in and its contact 148 will close. When the elevator stops and relay 134 is de-energized its contact 149 will reclose to energize solenoid 153 in valve 52 causing the shifter frame to return to its starting position so that the pallet may be loaded with the first load unit for the next layer or tier. In that position limit switch 121 will be tripped by the pin 56 to open its contact 152 to de-energize relay 147 and the solenoid 153 in valve 52 and stop the shifter frame. Contact 154 on relay 147 is open while the carrier is moving so as to prevent operation of the loading solenoid 106.

*Operation L.*—After the elevator has been lowered one step, the contact 144 on limit switch 142 will close and when the contact 140 on relay 134, and the contact 154 on relay 147 reclose, the operations A—L are repeated.

*Operation M.*—The preceding operations are repeated until the last layer or tier of boxes have been loaded on the pallet. Then the pin 90 on the elevator will trip limit switch 156 instead of limit switch 142. The first contact 157 on limit switch 156 will open to de-energize the relay 134 and the solenoid 136 thereby stopping the elevator. The second contact 158 will open to hold up the loading operation and a third contact 160 opens to stop the pallet shifter movement. A fourth contact 161 in switch 156 closes to energize the solenoid 44 (Fig. 5) to raise the arms 35 to release the loaded pallet.

*Operation N.*—The energization of the solenoid 44 will, by means of a pin 195, in the same manner as has been explained in connection with the solenoids 28 and 31 (Fig. 2), trip a limit switch 162 to close its first contact 163 and again energize the solenoid 44 to return the raised arms 35 (position *d* in Fig. 6). At that time limit switch 121 will be tripped to open its contact 152 to de-energize solenoids 150 and 44 causing the shifter frame to stop and the arms 35 will be lowered, position *e* in Fig. 6.

*Operation O.*—At the same time a third contact 165 on the limit switch 121 will close and since the fifth contact 166 on the limit switch 156 is now closed, the relay 167 will be energized. Its contact 168 seals in and at the same time energizes solenoid 46 (Fig. 5) causing the arm 35 to be lowered (position *e* Fig. 6). Thus the empty pallet is caught between an arm 35 and arm 36.

*Operation P.*—The lowering of the arm 36 will by means of a pin 196 cause tripping of a limit switch 170 on the shifter frame so that its contact 171 will again energize the solenoid 114 in valve 52 via the closed contact 172 on solenoid 44, and cause the shifter frame to move an empty pallet onto the elevator and push the loaded pallet out of the machine, (position *e*, Fig. 6). The contact 173 on relay 167 is open to prevent arms 35 from being raised while the shifter frame is in motion. The contact 131 on limit switch 130 will open when the shifter movement is completed.

*Operation Q.*—At the same time a fourth contact 175 in limit switch 130 will close, and, since a third contact 176 on relay 167 is now closed, the relay 177 will be energized and a first contact 178 on relay 177 will close to seal in. A second contact 179 will open to de-energize relay 167 and the solenoid 46 whereby to raise the arm 36 and cause the contact 171 to open. Contact 173 reclosing will again energize solenoid 44 to raise the arms 35 and trip limit switch 162. These two motions will release the loaded pallet. The contact 163 will close to energize the solenoid 153 in valve 52 to again return the raised arms 35 to starting position. At that point limit switch 121 will be tripped by pin 56 to open its contact 152 to de-energize the solenoids 150 and 44 there-by stopping the shifter movement and lowering arms 35 to energize the empty pallet.

*Operation R.*—Since the contact 179 on relay 177 is now open, relay 167 and solenoid 46 will not now be energized and the shifter arm 36 will remain raised (position *a* Fig. 6) and the loading frame will remain over the platform 3. Since contact 176 is now closed and contact 180 now closes, solenoid 181 in elevator valve 65 will be energized and the elevator platform with the empty pallet will be raised to top position. Contact 182 is open to prevent starting the loading operation before the elevator platform has been raised. When the elevator platform has reached the top the contact 184 on limit switch 138 will open to deenergize the relay 177 and the solenoid 181 to stop the elevator movement. The contact 139 will reclose for further operations of the relay 111.

*Operation S.*—At this time the fourth contact 182 on relay 177 will reclose to allow automatic restarting of all operations.

*Optional operation.*—When it is desired to start the sequence of operations at operations N or O to pick up an empty pallet, it can be done by pressing the starter switch button 95 when the elevator is lowered.

*Emergency stopping.*—The machine may be stopped at any time by closing one of the momentary control switches 190 or 191. Then the pistons in the loading cylinder 23, shifter cylinder 50 and elevator cylinder 64 will stop where they are and must then be moved manually to normal starting positions before automatic operations can be restarted and such manual operation will place the valve solenoids in position for automatic operations. The other solenoids being single acting will take their spring operated positions. The loading arms 20 will be raised, stop 17 will be raised and stop 16 lowered. The shifter arms 35 will be lowered and the arm 36 raised. The same condition will exist in case of a power failure during operation. Restarting will not take place until the starting switch 95 is closed. With reference to the wiring diagrams it should be noted that limit switches are described as operating or actuating a certain number of contacts. This form of description has been chosen for the sake of simplification. Obviously, whenever desired or more practical, relays will be used in the actual installation and much wiring shown in the drawings will be omitted and elements connected by a single wire where the diagrams may show more than one wire between elements. However, the contacts and layout of the wiring diagrams is such that the operations can be understood in their logical sequence.

Figure 12:
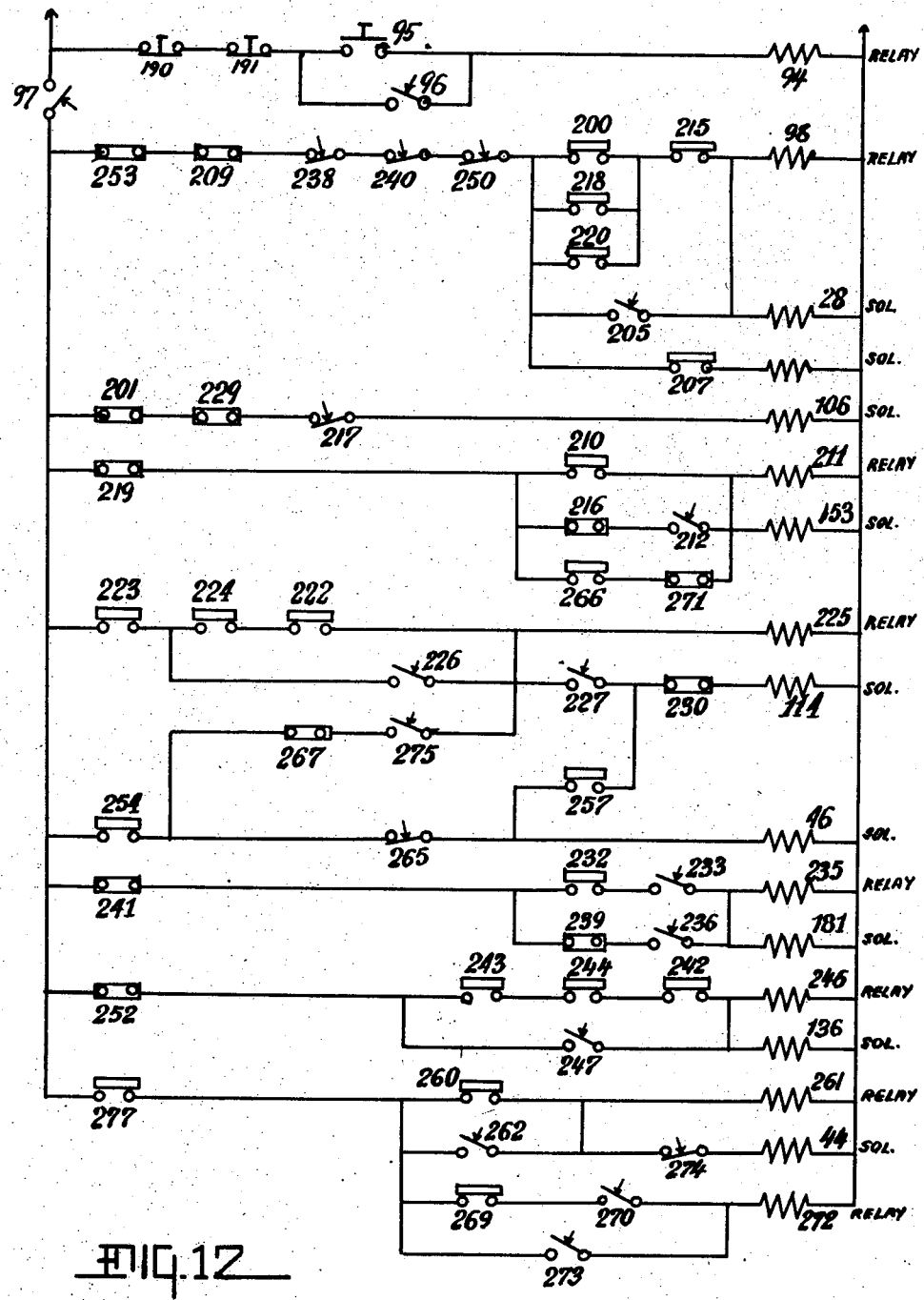
Fig. 12 is a wiring diagram similar to that shown in Fig. 9 but illustrates the reverse operation of removing the boxes from the pallet into the warehouse.

As stated in the beginning of this specification, the machine is also adapted for unloading a pallet and delivery of boxes into the warehouse. So far as the mechanical devices are concerned there is no difference except operations in the reverse order. The feeding conveyor 1 will of course be inclined away from the platform 3, or it may remain upwardly inclined and power-driven. In the reverse operation a different electric diagram is required as shown in Fig. 12, to be read together with diagrams Figs. 13, 14 and 15.

*Unloading pallet to warehouse.*—The normal starting will be with a loaded pallet in position to discharge the topmost layer of boxes. The loading frame with the arms 20 will be in position, alongside the load of boxes. The arms 20 will be raised. Operation is started by closing the starter switch 95 to energize relay 94 whereby the relay contact 96 will close to seal in and the relay contact 97 will close to energize the control circuit. The operations will then occur in the following sequence:

Operation 1.—Since the loading frame and the pallet shifter frame are in their extreme starting positions, a contact 200 on the limit switch 104 and a contact 201 on the limit switch 101 will be closed and the relay 98 will immediately be energized. Contact 205 will be closed to seal in and at the same time will energize solenoid 28 causing the loading arms 20 to be lowered and grip the first unit of boxes to be removed from the pallet load.

Operation 2.—At the end of the arms movement the limit switch 101 will be tripped to close a contact 207 which will energize solenoid 117 to operate the valve 32 so that pressure will be admitted to cylinder 23 to move the first boxes off the load.

Operation 3.—Completion of this arms movement will trip limit switch 118 whereby a contact 209 will open to de-energize relay 98, solenoids 28 and 117. This causes the loading frame to stop and raises arms 20 thereby releasing the first load unit which will then pass onto the conveyor 1 into the warehouse.

Operation 4.—At the same time contact 210 will close to energize relay 211. Contact 212 will close to seal in and at the same time will energize solenoid 153 in valve 52 to start moving the pallet shifting frame.

Operation 5.—When the relay 98 is de-energized during operation 3 its contact 217 recloses, and since a contact 229 on limit switch 101 now closes the contact 217 energizes solenoid 106 whereby the loading frame is moved back to the boxes with the arms 20 raised. Completion of this movement will trip limit switch 108. Contact 201 will open to de-energize solenoid 106 to stop the loading frame and contact 215 will close for the next unloading cycle. Movement of the loading frame has opened contact 200 to prevent restarting of operation 1 before the pallet is in position to unload the next boxes.

Operation 6.—The pallet shifter frame will have moved one space to trip limit switch 126 which will open contact 216 de-energizing relay 211 and solenoid 153 and stopping the shifter frame movement. At the same time contact 218 will close to again energize relay 98 causing operations 1 to 5 to be repeated.

Operation 7.—When the shifter frame moves into its last space, the limit switch 121 will be tripped. Contact 219 will be opened to de-energize relay 211 and solenoid 153 thereby stopping the shifter frame movement. Contact 220 will close to energize relay 98 and cause operations 1 to 5 to be repeated and whereby the last boxes will be removed from the pallet.

Operation 8.—During operation 4 limit switch 118 is tripped; contact 222 will close. Since contact 223 and contact 224 are now closed, relay 225 will be energized. Contact 226 will be closed to seal in. Contact 227 will close to energize solenoid 114 causing the shifter frame to return to starting position. Contact 229 will open to prevent starting operation 1 while the pallet shifter frame is moving.

Operation 9.—Completion of this motion will trip limit switch 117. Its contact 230 will open to de-energize solenoid 114 and stop the shifter frame. Contact 232 will close and since contact 233 on relay 225 is still closed, relay 235 will be energized. Contact 236 will close to seal in and at the same time will energize solenoid 181 in valve 65 causing the elevator to start raising the pallet. Movement of the elevator platform will trip limit switch 156 and contact 239 will close to hold in relay 235 and solenoid 181. Contact 240 will open to de-energize relay 235. Contact 240 on relay 235 will open to prevent starting operation 1 while the elevator is moving.

Operation 10.—When the elevator has risen one step limit switch 156 will be tripped a second time. Contact 239 will re-open to de-energize relay 235 and solenoid 181 stopping the movement of the elevator. Contact 223 and contact 240 on relay 235 will re-close causing operations 1–10 to repeat to unload the next tier of boxes.

Operation 11.—When the elevator has moved its last step, limit switch 138 will be tripped. Contact 241 will open to de-energize relay 235 and solenoid 181 stopping the elevator. Contact 240 on relay 235 will re-close to repeat operations 1–7 whereby the last tier of boxes are removed from the pallet.

Operation 12.—During operation 4 when limit switch 118 is tripped, its contact 242 will close. Since contact 243 and contact 244 are now closed relay 246 will be energized. Contact 247 will seal in and at the same time will energize solenoid 136 in valve 65 to return the elevator to its starting position. Contact 250 will open to prevent starting operation 1 while the elevator platform 7 is moving.

Operation 13.—The completion of the elevator movement will cause the contact 252 to open to de-energize relay 246 and solenoid 136 thereby stopping the elevator movement. Contact 253 will open to prevent starting operation 1 while the elevator is down. Contact 254 will close to energize solenoid 46 causing shifter arm 36 to be lowered to grip the next loaded pallet.

Operation 14.—Completion of this movement will trip limit switch 170. Contact 257 will close to energize solenoid 114 causing the pallet shifter frame to move the next loaded pallet into the machine and move the empty pallet out of the machine.

Operation 15.—Completion of this movement will cause contact 230 to open to de-energize solenoid 114 stopping the loading frame. Contact 260 will close to energize relay 261. Contact 262 on relay 261 will close to seal in and at the same time will energize solenoid 44 thereby causing the shifter arms 35 to be raised and release the empty pallet. Contact 265 on relay 261 will open to de-energize solenoid 46 to again raise the shifter arms 35 and release the next loaded pallet.

Operation 16.—The raising of shifter arms 35 will trip limit switch 162 to close contact 266 and the raising of the shifter arm 36 will trip limit switch 170 to re-close contact 268. Solenoid 153 will be energized and the pallet shifter arms will be moved to its pallet shifting position with all the arms raised.

Operation 17.—Completion of this motion will cause contact 219 to open and de-energize solenoid 153 and stop the shifter frame from further movement. Contact 269 will close, and since contact 270 on relay 261 is now closed, contact 269 will energize relay 272. Its contact 273 will close to seal in. Contact 274 will open to de-energize solenoid 44 causing the shifter arms 35 to be lowered to grip the loaded pallet.

Operation 18.—Completion of this motion will cause re-closing of contact 268. Since contact 275 on relay 272 is now closed, relay 235 will be energized. Contact 227 on relay 235 will close to energize solenoid 114 causing the frame to move the loaded pallet shifter into the elevator and pushing the empty pallet out of the machine.

*Operation 19.*—Completion of this motion will again cause contact 230 to open to de-energize solenoid 114 stopping the shifter frame. Contact 232 will close and energize relay 235, contact 233 being closed. Contact 236 on relay 235 will close to seal in and at the same time energize solenoid 181 causing the elevator cylinder to start lifting the loaded pallet.

*Operation 20.*—Motion of the elevator platform will cause contact 277 to open to de-energize the relays 261 and 272. Contact 254 will open to de-energize relay 225. When the loaded pallet has been raised one step to unload the top tier of boxes, the contact 239 will open to de-energize the relay 235 and the solenoid 181 thereby stopping the rise of the elevator. Contacts 223 and contact 240 will re-close to automatically start operation 1 and the complete unloading of the pallet.

*Optional starting.*—If it is desired to start the sequence of operations at operation 13 or 14 it can be done by closing the starter switch 95 when the elevator is lowered.

*Emergency stopping.*—The machine can be stopped at any time by pressing one of the momentary stop buttons 190, 191. The loading frame, the pallet shifter frame and the elevator will stop where they are and must then be moved manually to their normal starting positions before automatic operation may be restarted. The loading and shifter arms actuated by single acting solenoids will take their normal positions when these solenoids are de-energized. The loading arms 20 will be raised and the shifter arms 35, 35 will be lowered. The same condition exists when a power failure occurs during operation of the machine, but operation will not attempt to restart until the start button is pressed.

Figs. 16 and 17 illustrate a modification in which the pallet 6 is moved by a chain conveyor 300 having pallet gripping bars 302. Likewise the empty pallets at 304 may be moved into the machine by a chain conveyor 306 operating underneath the pallet bin 308.

Figs. 20 and 21 illustrate a modification in which the containers and boxes are loaded from conveyor 310 onto a transfer sheet which rests upon the elevator platform. This conveyor is similar to the conveyor 1. As the containers are fed forward to the machine they run against a stop 311 on the conveyor and the two first of the containers 312 are then automatically alined with a transfer sheet 313 on the elevator platform which has been raised to load receiving position. The boxes or containers are loaded upon the transfer sheet by a pusher member 314 operated by a hydraulic cylinder 315 which performs the same function in Fig. 20 as the loading cylinder 23 in Fig. 1. The pusher member includes a stop arm 316 which holds back the boxes or containers on the conveyor while the two first containers are pushed onto the transfer sheet 313. The pusher member is retracted, two more containers moved into loading position and pushed onto the transfer sheet 313, at the same time pushing the first two containers the width of one container against an adjustable stop similar to 311. The first tier of four containers is now loaded. This operation is repeated for each tier of containers, the elevator being lowered the height of a container for each tier as hereinabove described.

If the containers have rough surfaces on top and bottom, or if these surfaces are otherwise uneven, an auxiliary loading plate 317 is provided. This plate 317 is suitably guided and suported, not shown, and attached to the piston stem of an operating cylinder 318.

If the transfer sheet 313 is smooth enough to receive the first tier of containers the auxiliary loading plate 317 need not be used. Only when the containers do not slide on one another, or where such sliding is not desired due to the possible damages caused by the sliding of one surface against the other, should the auxiliary plate 317 be used. The plate when used is retracted for each tier and slid forward to receive the next tier, in sequence with the elevator. When the top or last tier of containers is placed the elevator is lowered to level with the transfer sheet feeding, and load discharging conveyors.

When the fully loaded transfer sheet on the elevator platform 319 is lowered to the bottom position as in Fig. 21 a load removing pusher plate 320 is actuated by a cylinder 321 and pushed forward against the edge of the loaded transfer sheet which is pushed out from the machine and onto a conveyor 322 from which the load and the transfer sheet will be removed by a fork truck, not shown.

The load removing pusher plate 320 has its forward half portion of a thickness sufficient to engage the loaded transfer sheet. And this forward portion also supports and holds a single transfer sheet which is dropped from a pile of sheets placed in sheet bin 325 as the plate returns to starting position. The rear half portion 326 of the removal plate is twice as thick as the front half portion and where they meet forms a step 327 adapted to engage the lowermost transfer sheet in the bin so that when the removal plate is operated forwardly by the cylinder 321, it not only pushes the load from the machine but at the same time pushes a transfer sheet from the bin onto the elevator platform which is then raised.

The device illustrated in Figs. 20 and 21 provides a mechanism for loading containers, bags, and parts, lending themselves to be mechanically stacked in unit loads with or without the use of pallet, skid, or transfer sheet, in tiers. It includes an auxiliary loading plate to permit loading without the sliding of one container over another when such sliding would either be difficult to accomplish, as for bags, or would mar or damage the surface of the containers. It includes also a removal plate which in one operation pushes an empty transfer sheet onto the elevator and a loaded transfer sheet onto the discharge conveyor.

The accuracy in placing and spacing containers which is secured through the loading and shifter arms described and shown, is offset by the much simplified design and operation of the modified device in Figs. 20 and 21, which, with the auxiliary loading plate inactive and out of the way of the elevator, will operate in the reverse to unload unit loads.

In the appended claims the term box is used merely to identify a packaged unit to be passed through the machine and without implying any particular limitation. Likewise the term pallet is used to signify any carrier, skid, or sheet of paper.

*Automatic operation.*—Complete automatic operation both for loading and unloading is effected by identical methods and devices to those shown and described. But for the modification which is shown in Figs. 20 and 21, an alternate and simplified system of control without the various solenoids, relays, and limit switches will include five revolving indexing cams, each one of which would operate through its cam follower a four-way valve, one for each of the four cylinders plus one additional valve for the elevator operating cylinder.

A push button will start an electric motor which drives mounted on one shaft, two indexing cams—one which starts and stops the removal cylinder 321 once for each load, and the other which starts the elevator from its fully loaded position and brings it to level with the transfer sheet feeding and load discharging conveyors, stops the elevator long enough for the operation of the removal cylinder, and then starts it again with an empty transfer sheet and comes to a stop at loading position. At this point another electric motor with three indexing cams on one shaft is started and the first motor is stopped. These three cams on their shaft make one turn for each tier in the load, and control the elevator cylinder, the pusher cylinder 315, and the auxiliary loading plate cylinder 318. The pusher cylinder 315 has as many strokes as each tier has strings of boxes, while the two other cylinders make one stroke each per revolution of the cam shaft. The first electric motor is started automatically when the three cams have carried out the control of the loading of one load.

I claim:

1. A loading machine of the character described including a conveyor for feeding a string of boxes to the machine, stop means for interrupting the feeding of boxes and separate a load unit and stop the same in position for removal to a pallet, an elevator adapted to support a pallet in successive load receiving positions as the boxes are successively placed upon the pallet, a gripping mechanism including arms for gripping said separated load unit, means for operating the gripping mechanism to cause its arm to grip the load unit and place the unit upon the pallet and release the load and return for another load unit, means on the elevator for moving the pallet across the line of movement of the boxes from said conveyor to said pallet to position the latter to receive load units in side by side formation, means for lowering the elevator stepwise for each layer of boxes placed upon the pallet, mechanism for operating said shifting, means to move the loaded pallet from the machine and electrically actuated means for operating all of the aforesaid elements of the machine.

2. A machine for loading boxes upon a pallet in side by side position to form layers of boxes, one layer upon the other, comprising a conveyor for feeding the boxes to the machine, an elevator for supporting the pallet to be loaded, elevator operating means including mechanisms for placing the elevator in a top position with the pallet to receive the first layer of boxes and for thereafter lowering the elevator step by step for each layer of boxes placed upon the pallet, means for removing the boxes from said conveyor in load units and place them upon the pallet or upon previously placed layers of boxes thereupon as the elevator is lowered as aforesaid, means for shifting said pallet upon the elevator in each of its said pallet load receiving positions to space the said load units to form a layer of boxes upon the pallet, mechanism for operating said shifting means to move the loaded pallet away from the machine and means for actuating all of the aforesaid means and mechanisms automatically in sequential order.

3. A loading machine of the character described having a conveyor for feeding boxes to the machine and mechanism for separating a predetermined number of boxes to form a load unit from the boxes on the conveyor, characterized in that the said mechanism includes; an inclined conveyor for feeding the boxes to the machine, a horizontal platform interposed between the machine and the conveyor and adapted to receive a load unit of boxes from the conveyor whereby an open space is formed automatically between the load unit on the platform and the boxes on the conveyor as the latter feeds boxes to the platform, a rotatable shaft, means for supporting the same underneath the platform, a first stop on said shaft adapted to prevent direct passage of boxes from the conveyor to the machine, a second stop on said shaft adapted to enter said open space to prevent passage of boxes from the conveyor to the platform after the latter has received a load unit and automatic means for rotating said shaft to alternately position the said stops in the line of feed of boxes to separate a load unit from the boxes on the conveyor.

4. A loading machine of the character described having a conveyor for feeding boxes to the machine and mechanism for separating a load unit of boxes from the boxes on the conveyor and means for gripping the load unit and loading it upon a pallet supported to receive the load unit characterized in that the said load gripping and loading means include: a movable loading frame comprising a rotatable shaft, loading arms on said shaft adapted to grip the load unit, means for moving said loading frame to position the arms in load unit gripping position, means for rotating said shaft to cause the arms to grip the load unit, means for moving said loading frame to convey the load unit to the pallet, means for rotating said shaft to cause the arms to release the load unit on the pallet and means for again actuating said first named moving means to move the loading frame back into load unit gripping position.

5. A loading machine of the character described having a conveyor for feeding boxes to a pallet placed upon an elevator characterized in that the said elevator include: an elevator platform adapted to support a pallet, means for raising the elevator in one movement from the bottom to the top to place the pallet in load receiving position and for lowering said platform a distance equal to the height of a layer of boxes for each layer of boxes to be placed upon the pallet and for lowering the elevator platform to the bottom when a pallet has been fully loaded and means for maintaining said platform immovable while the pallet is being loaded.

6. A loading machine of the character described having a conveyor for feeding boxes to a pallet placed upon an elevator and mechanism for shifting the pallet upon the elevator across the line of movement of the boxes on the conveyor so that the pallet be positioned to receive boxes in side by side formation characterized in that the said pallet shifting mechanism include: a reciprocable shifting frame, means for supporting the same upon said elevator means, a shaft in said frame, pallet gripping arms rotatably mounted upon said shaft, said arms comprising a pair of arms, means for simultaneously operating the same to grip pallet and release a pallet, a third arm, means for operating the same independently of the said pair of arms to grip a pallet between the latter and said third arm and release such pallet, means for moving said shifting frame upon the elevator while the latter is at a standstill to position the pallet to be loaded in predetermined positions in relation to the line of delivery of the load units from the conveyor to the pallet to cause the boxes to be placed upon the pallet in side by side formation and means for operating said shifting frame to move a loaded pallet out of the machine.

7. A loading machine of the character described comprising in combination a load unit receiving platform, a conveyor for feeding boxes to said platform to form load units upon the same, an elevator for supporting and moving a pallet, a loading mechanism for removing a load unit from said platform and loading it upon the pallet on the elevator, a mechanism for operating the elevator to place the pallet in vertically successive load unit receiving positions, a mechanism on the elevator for shifting the pallet horizontally in its different vertical positions to receive the load units in side by side formation and for moving the loaded pallet out of the machine, power means for operating said loading mechanism, said elevator operating mechanism and said pallet shifting mechanism and an electric control circuit operatively connected to the said power means and to the said several mechanisms for automatically actuating the said power means and several mechanism sequentially as aforesaid.

8. A loading machine of the character described having a conveyor for feeding boxes to a transfer sheet placed upon the conveyor, a pusher for moving the boxes from the conveyor unto the transfer sheet to form tiers of boxes thereupon, a supply of fresh transfer sheets, means for supporting the same in position to be placed upon the said conveyor, a second pusher for moving the loaded transfer sheet away from the machine and simultaneously therewith moving one of said fresh transfer sheets into the machine to receive a subsequent load of boxes and mechanisms for operating the said pushers.

9. A loading machine according to claim 8 including an auxiliary load receiving plate adapted to receive packages from the said conveyor, and means for moving said plate into package receiving position above a tier of packages previously loaded upon the said transfer sheet to receive the next tier of packages and for retracting said plate from underneath the packages placed upon the plate as the packages are formed into tiers upon said transfer sheet.

PREBEN JESSEN.

REFERENCES CITED

The following references are of record in the file of this patent:

UNITED STATES PATENTS

| Number | Name | Date |
|---|---|---|
| 655,337 | French | Aug. 7, 1900 |
| 817,375 | Keyes | Apr. 10, 1906 |
| 1,629,323 | Swartz | May 17, 1927 |